Jan. 21, 1958 G. S. FAY 2,820,954

PERMEABILITY TUNER STRUCTURE

Filed Jan. 7, 1955 2 Sheets-Sheet 1

INVENTOR.
GERALD S. FAY
BY James & Franklin
ATTORNEYS.

Jan. 21, 1958 G. S. FAY 2,820,954

PERMEABILITY TUNER STRUCTURE

Filed Jan. 7, 1955 2 Sheets-Sheet 2

INVENTOR
GERALD S. FAY
BY James & Franklin
ATTORNEYS.

2,820,954

PERMEABILITY TUNER STRUCTURE

Gerald S. Fay, Chicopee Falls, Mass., assignor to General Instrument Corporation, Elizabeth, N. J., a corporation of New Jersey Application January 7, 1955, Serial No. 480,369
10 Claims. (Cl. 336—131)

This invention relates to a permeability tuner and more particularly to an improved inductive tuner structure for the gang-tuning of a plurality of high frequency circuits.

The permeability tuner of the present invention is of the type in which a tuner shaft directly controls and moves a plurality of cores, such as ferromagnetic cores, in unison relatively to fixed inductance coils to change the permeability and thereby effectively vary the inductances thereof to inductively tune the circuits to which the coils are connected.

The prime object of the present invention is directed to the provision of a permeability tuner of the character referred to in which the following coordinated purposes are achieved:

(1) A gang-tuner structure is provided which forms a compact unit of minimal space dimensions;

(2) The tuner embodies a unitary frame which mounts and houses all of the operating parts of the tuner, the unitary frame, which is die-cast, forming a sturdy, non-distortable carrier and support for all the tuner parts;

(3) The tuner is so designed that all of the tuner parts, namely, the tuner coils, cores and core driving mechanism, all themselves simplified in structure and coordination, may be disassembled from the unitary frame in an exceedingly simple manner; and (4) The tuner is provided with a resilient journalling of the tuner shaft, smoothly operating with the elimination of back-lash, the individual tuning elements being further provided with easily accessible and manipulable means for relatively adjusting the tuning elements to effect proper tracking in the tuning circuits.

To the accomplishment of the foregoing objects and such other objects as may hereinafter appear my invention relates to the permeability tuner structure as sought to be defined in the appended claims taken together with the following specification and the accompanying drawings, in which:

Referring now more in detail to the drawings, the permeability tuner structure comprises in its generic aspect a unitary supporting and housing frame F, inductive coils L fixedly mounted in the frame F, a carriage C movably mounted in the frame and carrying the cores R which are movable in the coils L for tuning the circuits to which the coils are connected, and a driving mechanism D for moving the carriage C.

Figure 1:
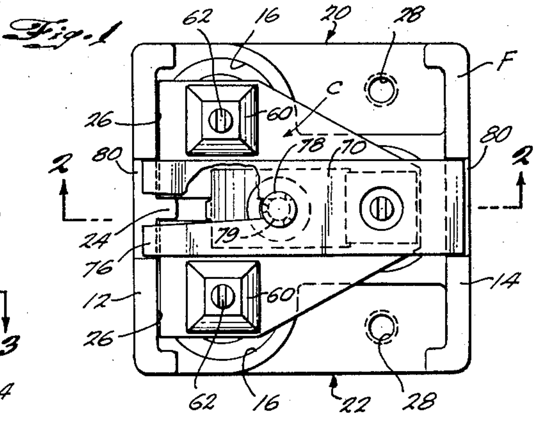
Fig. 1 is a top plan view of the tuner structure of the present invention.
Figure 2:
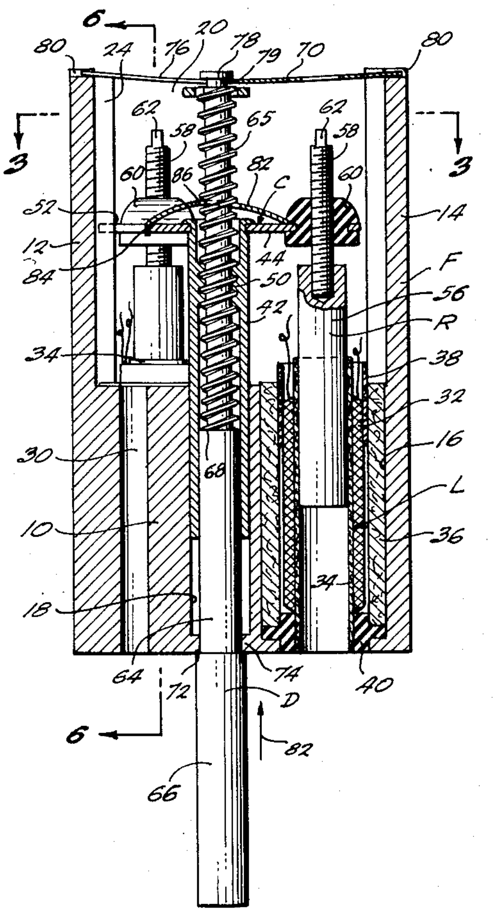
Fig. 2 is an elevational view of the same taken in cross-section in the plane of the line 2—2 of Fig. 1.
Figure 3:
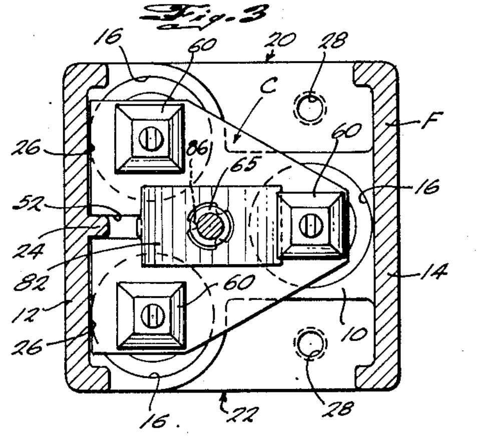
Fig. 3 is a view of Fig. 2 taken in cross-section in the plane of the line 3—3.

The unitary frame F comprises a die-cast unit, which may be made, for example, of a zinc base die-casting alloy, formed to provide a base portion 10 and the parallely spaced wall portions 12 and 14 extending from the base portion. The base portion 10 is formed in the die-casting operation with parallely arranged coil receiving wells 16, 16 and a shaft receiving well 18, these wells being open and rimmed at their bottoms. For gang-tuning, a number of core receiving wells 16, 16 are provided, three such wells, circumferentially arranged about the shaft receiving well 18, being provided in the exemplified tuner, as best shown in Figs. 2 and 3 of the drawings. The walls 12 and 14, on opposite sides of the unit, serve to enclose and protectively house the tuner parts, while the open spaces at the sides 20 and 22 (between the walls; see Figs. 2 and 3) permit ready accessibility to the tuner operating parts. One of the walls, such as the wall 12, is formed with means such as the rib 24, aided by the faces 26, 26, for cooperation with the carriage C in the manner to be later described to guide the carriage in its longitudinal movement in the frame and restrain the same against rotation in such movement. The base portion 10 is also preferably formed with panel or chassis mounting orifices 28, 28 in the base bottom and bore 30 in the base body. The thus formed unitary frame mounts and houses all of the tuner parts and forms a sturdy, rigid and non-distortable carrier and support therefor.

The tuner coils L are received by and fixedly mounted within the wells 16. Each coil L may comprise a coil winding 32 wound on a form 34 fitted into a magnetic shell 36 (acting to shield the core from external magnetic influences and to advantageously affect the tuning characteristics of the coil) and held thereto by a paper or similar shim 38, the magnetic shell 36 being diametered to closely fit the well. The coil parts of each coil L may be further rigidly supported at the rimmed bottom of the well by the flanged rubber washer 40. The coils L may be assembled to the frame merely by slipping the described coil parts separately or as a unit into the frame wells 16.

Figure 4:
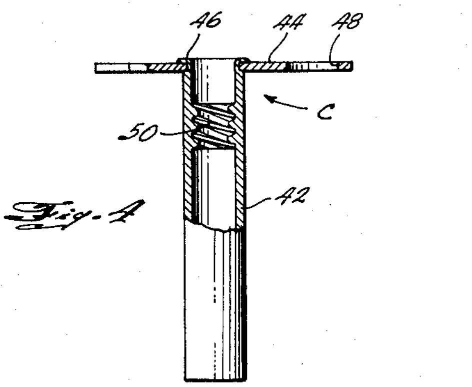
Fig. 4 is an elevational view of the carriage of the tuner.
Figure 5:
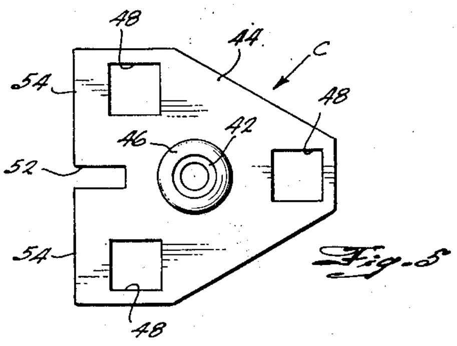
Fig. 5 is a plan view of the carriage.

The carriage C comprises a longitudinal tubular member 42 received by (with a close fit) and axially movable in the shaft receiving well 18 and a transverse plate shaped member 44 attached thereto as at 46, said transverse member being apertured at 48, 48 for mounting and carrying the tuner cores R. The tubular member 42 is formed with an internally threaded section 50 for mating with the driving part of the driving means D to effect the axial movement of the carriage, as will be presently described. The transverse member 44 is formed in one of its sides with a groove or slot which mates with (rides on) the frame wall rib 24 for guiding the longitudinal or axial movement of the carriage and for restraining the carriage against rotation in the frame, this being aided by the riding engagement of the edges 54, 54 of the transverse member with the wall faces 26, 26. The simplicity of the structure of the carriage, whilst serving these several described purposes, will be particularly seen by viewing Figs. 4 and 5 of the drawings.

Figure 6:
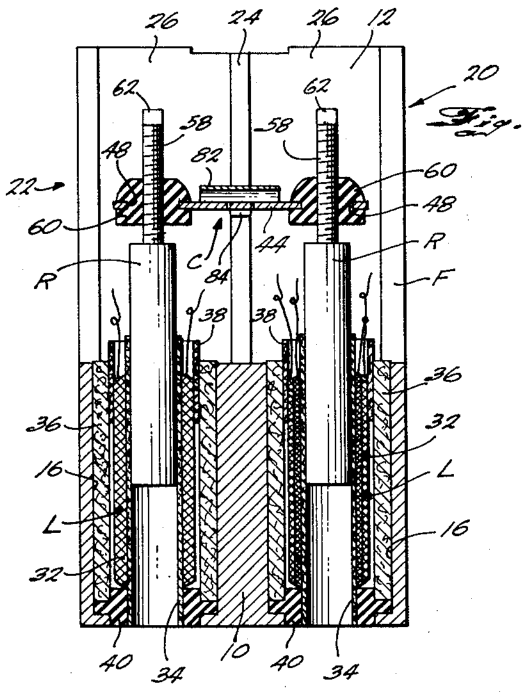
Fig. 6 is a view of the tuner taken in cross-section in the plane of the line 6—6 of Fig. 2.
Figure 9:
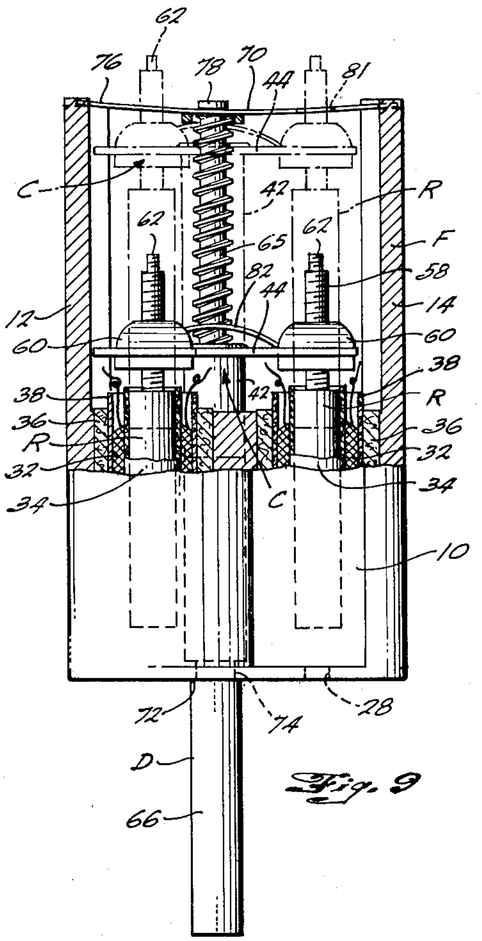
Fig. 9 is an elevational view of the tuner, similar to Fig. 2, with parts broken away and other parts shown in section and depicting the operation of the tuner.

The cores R which are conventionally ferromagnetic in character (but may be conductive) each comprise a rod shaped piece 56, to which is fixed a screw threaded holder 58, each core being carried by the transverse member 44 of the carriage C by means of the holder 58 held centrally in a resilient, such as a rubber, grommet 60 inserted in the member aperture 48; the screw holder 58 terminates in a tool engageable squared end 62. Each core piece 56 is telescopically movable in its associated coil form 34 as is clearly depicted in Figs. 2, 6 and 9.

The threaded mating adjustment of the core holder 58 in the rubber grommet 60 provides an exceedingly simple means, readily accessible and manipulable, for relatively adjusting the different tuning elements to effect proper tracking of the tuning circuits.

The driving mechanism D comprises a shaft 64 extending through the carriage tubular member 42 and rotatable in the shaft receiving well 18 of the frame. The upper section of the shaft 64 is formed with a driving screw 65 which mates with the threaded section 50 of the carriage member 42, this functioning to move the carriage axially upon rotation of the shaft 64, which shaft may be manually rotated by manipulating the shaft extension 66. Engagement of the threaded section 50 with the shoulder 68 on the shaft 64 stops or limits the inward movement of the carriage.

Figure 7:
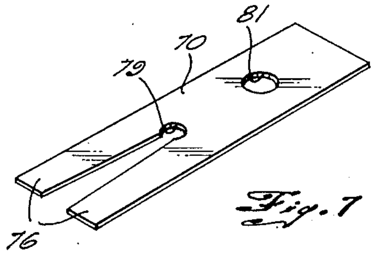
Figs. 7 and 8 are perspective views of certain detail parts.
Figure 8:
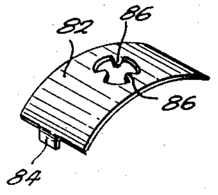

The shaft is journalled at one end in the frame base 10 and at its opposite end in a member 70 which bridges the tops of the frame walls 12 and 14. The journalling in the base 10 is provided by a shoulder 72 on the shaft engaging the rim 74 formed at the bottom of the well 18. The bridge member 70 (see particularly Fig. 7) consists of a leaf spring having bifurcated arms 76 for detachably receiving the grooved head 78 formed at the end of the shaft screw section 65, the shaft being journalled in the leaf spring by means of the head 78 seating in the end 79 of the grooved formed by the arms 76. The bridge-spring 70 is detachably supported on the tops of the walls 12 and 14, the opposite ends of the bridge piece being mounted therein and held against rotation by being seated in the grooves 80, 80 in the wall tops. The bridge piece is orificed at 81 to permit movement of a core holder 58 therethrough. The parts of the structure are so dimensioned that in the assembled tuner, the bridge-spring 70 is under tension (see Figs. 2 and 9) and thereby the driving mechanism D and the carriage C are resiliently supported in the frame, the spring action being in the direction indicated by the arrow 82' (Fig. 2). To eliminate back-lash there is also provided the tension drive nut 82 anchored at 84 to the carriage part 44 and formed with internally directed nibs 86 (see Fig. 8) engaged by the thread of the driving screw 65.

The manner of making, assembling and operating the tuner of the present invention will in the main be fully apparent from the above detailed description. As a whole a tuner is provided which is compact and occupies minimal space dimensions; in the exemplified tuner, usable for the gang-tuning of three circuits, the overall dimensions are as small as 1¼" square for the base and 2¼" for the unit height. The unitary frame F mounts and houses all of the tuner parts and possesses the other advantages described. The assembling (and disassembling) of the parts is extremely simple; the coils L are merely slipped into the frame wells 16, 16; then the drive means D and the carriage C (with cores attached) are moved into the shaft receiving well 18 from opposite directions and are interengaged at their screw mating sections (with the spring nut 82 put in place), and the bridge-spring 70 is then merely slipped into its bridging position, all of the parts being thereupon supported on the frame. The carriage C with its coils and cores is so disposed relatively to the driving mechanism D as to produce a mechanically balanced arrangement. All the moving parts are resiliently journalled and the carriage is moved axially with ease, without back-lash and with a high degree of tuning accuracy.

It will be further apparent that while I have described the invention with reference to a preferred form of embodiment, that many changes may be made therein without departing from the spirit of the invention defined in the following claims.

I claim:

1. A permeability tuner structure comprising a unitary one-piece frame providing a base portion and a portion extending from the base portion, the base portion being formed with parallely arranged coil and shaft receiving wells, tuner coils mounted in and fixedly supported by the walls of the coil receiving wells, a movable carriage including a longitudinal member received with a close fit by and axially movable in the shaft receiving well and a transverse member attached thereto engaging and guided by said extending portion to restrain the carriage against rotation in its movement, said transverse member carrying cores axially movable in said coils, a tuning shaft rotatable in said shaft receiving well, and mating means on said shaft and longitudinal member for imparting an axial movement to the member upon rotation of the shaft.

2. A permeability tuner structure comprising a unitary one-piece frame providing a base portion and a wall portion extending from the base portion, the base portion being formed with parallely arranged coil and shaft receiving wells, tuner coils mounted in and fixedly supported by the walls of the coil receiving wells, a movable carriage including a longitudinal sleeve member received with a close fit by and axially movable in the shaft receiving well and a transverse member attached thereto engaging and guided by said wall portion to restrain the carriage against rotation in its movement, said transverse member carrying cores axially movable in said coils, and a tuning shaft within said sleeve member rotatable in said shaft receiving well, said shaft and longitudinal sleeve member being provided with mating threaded means operating for imparting an axial movement to the member upon rotation of the shaft.

3. A permeability tuner structure comprising a unitary one-piece frame providing a base portion and spaced wall portions extending from the base portion, the base portion being formed with parallely arranged coil and shaft receiving wells, tuner coils mounted in and fixedly supported by the walls of the coil receiving wells, a movable carriage including a longitudinal member received with a close fit by and axially movable in the shaft receiving well and a transverse member engaging and guided by a part of said frame to restrain the carriage against rotation in its movement, said transverse member carrying cores axially movable in said coils, a member bridging said wall portions, a tuning shaft rotatable in said shaft receiving well and journalled in said bridging member, and mating means on said shaft and longitudinal member for imparting an axial movement to the member upon rotation of the shaft.

4. A permeability tuner structure comprising a unitary one-piece frame providing a base portion and spaced wall portions extending from the base portion, the base portion being formed with parallely arranged coil and shaft receiving wells, tuner coils mounted in and fixedly supported by the walls of the coil receiving wells, a movable carriage including a longitudinal member received with a close fit by and axially movable in the shaft receiving well and a transverse member engaging and guided by one of said wall portions to restrain the carriage against rotation in its movement, said transverse member carrying cores axially movable in said coils, a member bridging the top of said wall portions, a tuning shaft extending within said sleeve member rotatable in said shaft receiving well and journalled at one end in said base portion and at the other end in said bridging member and mating means on said shaft and longitudinal member for imparting an axial movement to the member upon rotation of the shaft.

5. The tuner structure of claim 1 in which the cores are axially adjustable on said transverse member by means of a threaded rod fixed to the core adjustably threadable in a resilient grommet fixed to the transverse member.

6. The tuner structure of claim 1 in which the unitary frame is a die-cast frame, with all the portions and wells thereof formed in the die-casting operation.

7. The tuner structure of claim 3 in which the bridging member is a leaf spring detachably engaging the wall portions, detachment of said leaf spring permitting the disassembling of the carriage, shaft and coils from the frame.

8. The tuner structure of claim 4 in which the bridging member is a leaf spring the resilience of which acts axially on said shaft to resiliently support the shaft and carriage in the frame.

9. The tuner structure of claim 4 in which the bridging member is a leaf spring detachably engaging the top of the wall portions, the resilience of the leaf spring acting axially on the shaft to resiliently support the shaft and carriage in the frame, detachment of the leaf spring from the wall portions permitting the disassembling of the carriage, shaft and coils from the frame.

10. A permeability tuner structure comprising a unitary one piece frame providing a base portion and a wall portion extending from the base portion, the base portion being formed with parallely arranged coil and shaft receiving wells, tuner coils mounted in and fixedly supported by the walls of the coil receiving wells, a movable carriage including a longitudinal member received with a close fit by and axially movable in the shaft receiving well and a transverse member attached thereto, rib and groove means on said transverse member and said wall portion for guiding the movement of said carriage and for restraining the carriage against rotation in its movement, said transverse member carrying cores axially movable in said coils, a tuning shaft rotatable in said shaft receiving well, and mating means on said shaft and longitudinal member for imparting an axial movement to the member upon rotation of the shaft.

References Cited in the file of this patent

UNITED STATES PATENTS 2,158,252 Polydoroff ------------ May 16, 1939

FOREIGN PATENTS 867,016 France ---------------- Sept. 23, 1941